United States Patent Office 2,939,898
Patented June 7, 1960

2,939,898

RELEASING COMPOSITION CONTAINING METAL OLEATE, METHOD OF MAKING AND USING SAME

Erwin Aron, Paterson, N.J., assignor to Technical Processing, Inc., Paterson, N.J., a corporation of New Jersey No Drawing. Filed Apr. 17, 1957, Ser. No. 653,303

14 Claims. (Cl. 260—752)

This invention relates to a novel mold releasing agent and, more particularly, it pertains to a releasing agent for molding of rubber items.

In molding rubber it is necessary to avoid adherence of the rubber itself to the surface of the mold. Conventionally, for this purpose a mold releasing agent is applied to the surface of the compounded rubber or the mold prior to the molding operation. Such an operation is tedious and costly, considering that each individual item must be coated manually with the mold releasing agent. Another disadvantage in this technique is that the molds must be cleaned of accumulated deposits of the releasing agent. Also, in deep cavity molding the mold release agent tends to promote the formation of flow cracks. Thus, it is apparent that there is need for a mold releasing agent which is easily applied and requires little or no cleaning of molding surfaces and avoids the inherent disadvantages of surface coating.

An object of this invention is to provide a novel mold releasing agent which is especially suitable for rubber molding.

Another object of this invention is to provide a mold releasing agent which lends to use in a way to eliminate the tedious and costly practice heretofore known.

Other objects and advantages of this invention will become apparent from the following description and explanation thereof.

The mold releasing agent of this invention comprises a homogeneous mixture of an oleate salt of a metal selected from the group consisting of zinc, magnesium, lead and calcium, the oleate salt being in an amount such that the oleic acid equivalent thereof amounts to about 11 to 16% of the total composition; about 50 to about 60% of a lubricant selected from the group consisting of petroleum jelly and paraffin wax, about 4 to about 6% of a monohydric fatty alcohol containing about 12 to about 20 carbon atoms; about 4.5 to about 6.7% potassium stearate and about 14 to about 26% of excess stearic acid. The percentages specified above are on a total weight basis.

The releasing agent is prepared by reacting an oxide, hydroxide or carbonate of zinc, magnesium, calcium or lead with oleic acid in approximately stoichiometric proportions or in slight excess of about .25 to about 2% oleic acid to produce the corresponding oleate salt. The temperature for this reaction may be from about 90° to about 130° C., preferably about 95° to about 105° C. The temperature range also applies to other steps of preparing the homogeneous mixture. After the oleate salt is formed, the lubricant and the fatty alcohol are added and the total mixture is agitated until the ingredients are uniformly mixed. Next, stearic acid in the required amount is thoroughly mixed into the reaction mass. The oxide, hydroxide or carbonate of potassium is then added, and the mixture is agitated until a homogeneous mixture is obtained. By producing a homogeneous mixture, the initial ingredients become combined to give the composition qualities useful for mold releasing. The combination of ingredients may result from double decomposition between the oleate salt and the stearate salt, and from stearic acid reacting with potassium stearate to give the acid salt as well as dispersion and/or solution of components. In the mixture, part of the excess stearic acid may be free of association with the stearate salt. Hence, excess stearic acid designates the amount of stearic acid in excess of that required to produce the neutral salt of potassium stearate.

The type of starting materials and the way in which they are mixed to prepare the homogeneous mixture may be varied. As starting materials the oleate salt and the acid salt of stearic acid may be used. The total ingredients can be combined as a single step and then heated with agitation until the homogeneity is obtained. The preferred method of preparing the homogeneous mixture is to first react the inorganic compound of zinc, magnesium, calcium or lead with oleic acid, mix therewith the lubricant and fatty alcohol and then add stearic acid. The final step of the process is the addition of the potassium compound.

The excess stearic acid is an essential component of the mold releasing agent. It is found that without the excess stearic acid the composition is not useful for commercial purposes. The role of the excess stearic acid is not understood. By comparison with mixtures not having excess stearic acid, it is apparent that the acid cooperates with other components of the mixture to give a material which is exceptionally better in penetrating the rubber and more stable so that the releasing agent as a whole distributes uniformly in the rubber.

Petroleum jelly is the preferred choice of a lubricant. The superiority of petroleum jelly over paraffin wax, is shown in the condition of the molding surface after use and the ease with which the molded article separates from the mold. The reason that petroleum jelly functions better is not known. A typical petroleum jelly has a melting point of about 115° to 130° F. and preferably about 120° to 125° F. Paraffin waxes of petroleum origin having a melting point of about 110° to about 135° F. are useful.

The fatty alcohol used in making the homogeneous mixture acts as a binding agent for the other ingredients in the composition. This function is particularly noticeable at elevated temperatures normally encountered in use. The alcohol is monohydric and contains about 12 to 20 carbon atoms. Specific examples of alcohols are: lauryl alcohol, stearyl alcohol, cetyl alcohol, etc. It is preferred that the alcohol be saturated, although unsaturated alcohols such as oleyl alcohol can be used.

The mold releasing agent is incorporated into rubber during the compounding stage. In rubber compounding, raw rubber is first masticated to make it more pliable and then it is admixed with other compounding ingredients, such as pigments, e.g. carbon black; fillers, e.g. the oxides of zinc, magnesium, lead or calcium; vulcanizing agents, e.g. sulphur; etc. The mold releasing agent can be mixed with these additives before incorporation into the rubber or the releasing agent can be added to the compound rubber. In any event, the releasing agent is mixed thoroughly with the compounded rubber to effect uniform distribution. In general, about 0.25 to about 0.75% of the mold releasing agent, based on the total weight of the rubber item, is employed. These amounts can be employed whether the rubber is natural, synthetic or of the reclaimed type.

There are additional advantages to be gained from using the mold releasing agent. For example, it is found that the mold releasing agent facilitates blending or mixing of pigments such as carbon black and other difficultto-mix fillers in the compounding stage. Further, mixing or compounding is quickened by the presence of the mold releasing agent; extrusion operations are smoother and quicker; scorching and devulcanization are inhibited; the rubber cure is accelerated; and the mold releasing agent does not grain out in the finished rubber item. In respect to the molded rubber item, the mold releasing agent inhibits blooming, improves the aging qualities of the rubber item, increases the tensile strength of highly filled stocks, improves the resistance of rubber to ozone deterioration, and imparts sharper color definition and retention. In regard to production, the use of the mold releasing agent results in increased production, eliminates the need for stopping production to clean the molds, eliminates the manual labor involved in surface application of conventional mold releasing agents, decreases almost entirely the number of "rejects" of molded rubber articles formerly obtained and enables the molds to be stored without any further preparation. It is apparent from the foregoing advantages that marked improvements are achieved by means of the present invention.

In order to provide a fuller understanding of the invention, reference will be had to specific examples.

Example I 1.5 parts (all parts are by weight) of zinc oxide and 11 parts of oleic acid were heated to 100° C. with agitation until the ingredients were completely reacted. 60 parts of petroleum jelly and 4 parts of cetyl alcohol were added to the mixture. The mixture was maintained at 100° C. and agitated until the jelly and alcohol were completely mixed. Next, 21.7 parts of stearic acid were added to the mixture and agitation was continued until all the acid was thoroughly mixed. 1.8 parts of caustic potash (45% strength) were added to the mixture and the entire contents were agitated until a homogeneous mixture was obtained. The mixture was allowed to cool. It solidified into a soft waxy material.

The above mold releasing agent was employed in the manufacture of rubber heels. The rubber contained the following ingredients:

| | Parts by weight |
|---|---|
| Natural rubber (smoked sheet) | 15 |
| Reclaimed rubber | 30 |
| Rubber crumb (ground vulcanized rubber) | 25 |
| Reinforcing furnace black | 30 |
| Asphalt | 3 |
| Zinc oxide | 1 |
| Sulfur | 1.25 |
| Cyclohexylbenzthiacyl sulfenamide | 0.5 |

The ingredients were blended in a suitable mixer e.g. an open two roll mill in the usual manner, and thereafter the mold releasing agent described above in Example 1 was added thereto in an amount of 0.5 parts by weight. The compounded rubber was further mixed to insure uniform distribution of the releasing agent. The rubber was then molded into rubber heels at a temperature of about 153° C., using a curing time of about 15 minutes. Following the molding operation, it was noted that the mold surfaces were exceptionally clean as compared to those operations in which the rubber is surface coated with conventional mold releasing agents.

An extensive series of runs were made in order to determine whether the molding surfaces would remain as clean as in the case of the experiment described above. In these experiments the rubber was compounded in the same way as described hereinabove, using the same concentration of mold releasing agent. The mold releasing agent was prepared by the method described in Example I above. The results of this experiment showed that the mold releasing agent was effective in maintaining the molding surfaces clean after extensive use. There was no need to discontinue the operation in order to clean the surfaces of the mold. Further, the molded rubber items possessed all the characteristics described hereinabove.

Additional examples of mold releasing agents are given below.

Example II

| | Grams |
|---|---|
| Magnesia | 1.5 |
| Oleic acid | 16.0 |
| Petroleum jelly | 50.0 |
| Lauryl alcohol | 6.0 |
| Stearic acid | 24.5 |
| Caustic potash (45%) | 2.0 |

Example III

| | Grams |
|---|---|
| Litharge | 1.9 |
| Oleic acid | 12.0 |
| Petroleum jelly | 57.0 |
| Myristyl alcohol | 6.0 |
| Stearic acid | 20.5 |
| Caustic potash (45%) | 2.6 |

Example IV

| | Grams |
|---|---|
| Zinc oxide | 1.9 |
| Oleic acid | 13.0 |
| Petroleum jelly | 50.0 |
| Stearyl alcohol | 4.0 |
| Stearic acid | 29.3 |
| Caustic potash (45%) | 1.8 |

Having thus provided a description of the invention along with specific examples thereof, it should be understood that no undue limitations or restrictions are to be imposed by reason thereof but that the present invention is defined by the appended claims.

I claim:

1. A composition of matter comprising a homogeneous mixture of an oleate salt of a metal selected from the group consisting of zinc, magnesium, lead and calcium, the oleate salt being in an amount such that the oleic acid equivalent thereof amounts to about 11 to 16% of the total mixture, about 50 to about 60% petroleum jelly, about 4 to about 6% monohydric fatty alcohol containing about 12 to about 20 carbon atoms, about 4.5 to about 6.7% potassium stearate, and about 14 to about 26% excess stearic acid.

2. A composition of matter comprising a homogeneous mixture of an oleate salt of a metal selected from the group consisting of zinc, magnesium, lead and calcium, the oleate salt being in an amount such that the oleic acid equivalent thereof amounts to about 11 to 16% of the total mixture, about 50 to about 60% of a lubricant selected from the group consisting of petroleum jelly and paraffin wax, about 4 to about 6% of a monohydric fatty alcohol containing about 12 to about 20 carbon atoms, about 4.5 to about 6.7% potassium stearate, and about 14 to about 26% excess stearic acid.

3. A composition of matter comprising a homogeneous mixture of zinc oleate in an amount such that the oleic acid equivalent thereof amounts to about 11 to 16% of the total mixture, about 50 to about 60% of a lubricant selected from the group consisting of petroleum jelly and paraffin wax, about 4 to about 6% of a monohydric fatty alcohol containing about 12 to about 20 carbon atoms, about 4.5 to about 6.7% potassium stearate, and about 14 to about 26% of excess stearic acid.

4. A composition of matter comprising a homogeneous mixture of zinc oleate in an amount such that the oleic acid equivalent thereof amounts to about 11 to 16% of the total mixture, about 50 to about 60% of petroleum jelly, about 4 to about 6% of a monohydric fatty alcohol containing about 12 to about 20 carbon atoms, about 4.5 to about 6.7% potassium stearate, and about 14 to about 26% of excess stearic acid.

5. The composition of claim 4 wherein the fatty alcohol is cetyl alcohol.

6. The composition of claim 4 wherein the fatty alcohol is stearyl alcohol.

7. The process which comprises reacting a salt-forming compound selected from the group consisting of the hydroxide, oxide and carbonate of a metal selected from the group consisting of zinc, calcium, magnesium and lead with oleic acid at a temperature of about 90° to 130° C. to produce the oleate salt of the selected metal; adding to said oleate salt a lubricant selected from the group consisting of petroleum jelly and paraffin wax, a monohydric fatty alcohol containing about 12 to about 20 carbon atoms, and stearic acid; and then adding to the resultant mixture containing excess stearic acid a compound selected from the group consisting of the hydroxide, oxide and carbonate of potassium to produce a homogeneous composition containing by weight oleate salt in an amount such that the oleic acid equivalent thereof amounts to about 11 to 16% by weight of the composition, about 50 to 60% lubricant, about 4 to 6% fatty alcohol, about 4.5 to 6.7% potassium stearate, and about 14 to 26% excess stearic acid.

8. The process of claim 7 wherein the salt-forming compound is zinc hydroxide and the temperature of reaction is maintained at about 95 to 105° C.

9. The process of claim 7 wherein the salt-forming compound is zinc oxide and the temperature of reaction is maintained at about 95 to 105° C.

10. The process of claim 7 wherein the salt-forming compound is zinc carbonate and the temperature of reaction is maintained at about 95 to 105° C.

11. A process which comprises heating zinc oxide and oleic acid at a temperature of about 95 to about 105° C. to produce zinc oleate, admixing with zinc oleate petroleum jelly and a monohydric fatty alcohol containing about 12 to about 20 carbon atoms, admixing with the resultant mixture stearic acid, and thereafter adding potassium hydroxide and agitating until a homogeneous mixture is produced.

12. In the compounding of raw rubber the improvement which comprises adding to said raw rubber a homogeneous mixture of an oleate salt of a metal selected from the group consisting of zinc, magnesium, lead and calcium, the oleate salt being in an amount such that the oleic acid equivalent thereof amounts to about 11 to 16% oleic acid based on the total mixture, about 50 to about 60% of a lubricant selected from the group consisting of petroleum jelly and paraffin wax, about 4 to about 6% of a monohydric fatty alcohol containing about 12 to about 20 carbon atoms, about 4.5 to about 6.7% potassium stearate, and about 14 to about 26% of excess stearic acid.

13. In the compounding of rubber the improvement which comprises adding to said rubber a homogeneous mixture of zinc oleate in an amount such that the oleic acid equivalent thereof amounts to about 11 to 16% based on the total mixture, about 50 to about 60% petroleum jelly, about 4 to about 6% of a monohydric fatty alcohol containing about 12 to about 20 carbon atoms, about 4.5 to about 6.7% potassium stearate, and about 14 to about 26% excess stearic acid.

14. The process of claim 13 wherein the homogeneous mixture comprises about .25 to about .75% of the total rubber.

References Cited in the file of this patent
UNITED STATES PATENTS

| | | |
|---|---|---|
| 1,823,855 | Davis | Sept. 15, 1931 |
| 1,893,869 | Morton | Jan. 10, 1933 |
| 1,899,243 | Newton | Feb. 28, 1933 |
| 1,912,591 | Olin | June 6, 1933 |
| 1,936,561 | Kilbourne | Nov. 21, 1933 |
| 2,368,807 | Cowdery | Feb. 6, 1945 |